UNITED STATES PATENT OFFICE.

WM. BONNEY, OF NEW YORK, N. Y.

IMPROVED PROCESS OF IMITATING MARBLE AND OTHER SUBSTANCES.

Specification forming part of Letters Patent No. 11,468, dated August 8, 1854.

*To all whom it may concern:*

Be it known that I, WILLIAM BONNEY, of the city, county, and State of New York, have invented a new and useful improvement in the art and manufacture of imitations of marble and other variegated substances by the use of cement, plaster-of-paris, and other substances with coloring-matter; and I do hereby declare that the following is a full and exact description of the same.

In my manufacture I use the cements known as "Keene's" cement, the "Parian" cement, or any other cement, plaster-of-paris, or any other substance which will, after being mixed with water or other fluid, set or harden, combined or mixed with coloring-matter to give it the various colors and appearance of the marble or other substance which I desire to imitate, and my process or method of accomplishing my object is as follows: I take a portion of the cement or other substance of which the mass is to be formed and mix it with water or other fluid to such consistency that it will deliver from the apex of a syringe or other analogous instrument in a cord-like form, and color it to such hue as may be necessary for the purpose of imparting to the mass, in the manner hereinafter described, the shades that I may require. In this process mineral, smalts, or other colors may be used; but I think mineral colors or smalts colors are preferable, by reason of their cheapness and permanency and the facility with which they may be used. The mold or form upon or within which the mass is to be laid is so prepared as to perfect or approach as nearly as possible the quality of surface desired for the cast to be formed. If smooth surfaces are required, I use glass or other polished surface for the form or mold. It is obvious that a great variety of substances are applicable to this purpose. When the mold is prepared I take into the syringe a quantity of the colored cement, and then throw it out upon the surface of the form or mold in veins, dots, spots, or other devices, so disposed by means of the syringe as to accord with the substance I wish to imitate. When these have shrunk and dried a little, so that they will not be easily displaced or disturbed by laying on the mass, the ground or general face is laid on between and above these veins, &c., to any desirable thickness so as to complete the mass.

This ground, composed of the cement or other substance, may be previously colored in the mass to any required shade, according to the general color of the substance to be imitated. The veins, &c., being somewhat harder than the superincumbent mass, will penetrate the mass as it is laid on nearly to the extent of their thickness; but not being fully set or hardened will be readily incorporated with the mass in the process of hardening, so that the whole will become one solid block, slab, or manufacture, as the case may be. When the mass is set or become hard it is readily removed from the mold, and its surface improved and polished, if desired, by the use of putty powder, salts of baryta, or oleaginous substances in the usual manner. For many purposes, when glass is used for the form or mold, the surfaces by my method will be found perfect in respect to colors and sufficiently smooth without polishing. This method is adapted for making columns, table-tops, mantels, looking-glass frames, flooring, letters, handles for canes, umbrellas, &c.

Much of the success in the finer delineations will of course depend upon the experience and skill of the workman; but I believe my method and the means I employ for making and perfecting these imitations to be entirely new.

In case it is desired to make wall-pieces, paneling, &c., which are to remain permanently in the same situation, and which may without a form or mold be made, the mass may first be laid on, and while it is yet soft the colored cement may be delivered from the syringe upon the surface of the mass itself, the operator penetrating the mass a little with the apex of the syringe as the colored cement is forced out, so that the colors will go deep enough and the whole become one solid mass by hardening, as in the first-described process.

My method has great advantages over any means heretofore employed for imparting colors to cements, &c., for the purposes above mentioned. In the method of Charles Iles silk waste or other fibrous substances of the desired colors are disposed upon the face of the form or mold and the mass laid over it; but the colors in this method are liable to be imperfect and to lack permanence, and the face of the mass will always require rubbing down and polishing. Another method, employed by Scayliola and others, is to lay the coloring-matter upon the form or mold, or upon the mass itself, with a brush or other similar instrument; but it is manifest that in this way the disposition of the colors cannot be such as to effect a perfect imitation, while the colored matter will scarcely penetrate to sufficient depth in the mass to render the colors permanent.

I do not claim the compounding of cements or other materials for making imitations of marble or other substances, nor do I claim the placing on or disposition of the veins, &c., with a brush or other similar instrument, or by the use of fibrous materials, for these have been before known; but I do claim as my invention and desire to secure by Letters Patent—

The manufacture of imitations of marble and other substances from cements or other materials analogous thereto by the application, substantially as herein set forth, of the requisite coloring-matter, prepared as herein described, either to the surface of the cement or to a polished surface or mold by means of a syringe or other analogous instrument.

WM. BONNEY.

Witnesses:
ROBERT CARSON,
JACOB R. AMERMAN.